May 29, 1928.
H. G. BEEDE ET AL
VALVE FOR STEAM PRESSING MACHINES
Original Filed May 17, 1927
1,671,179
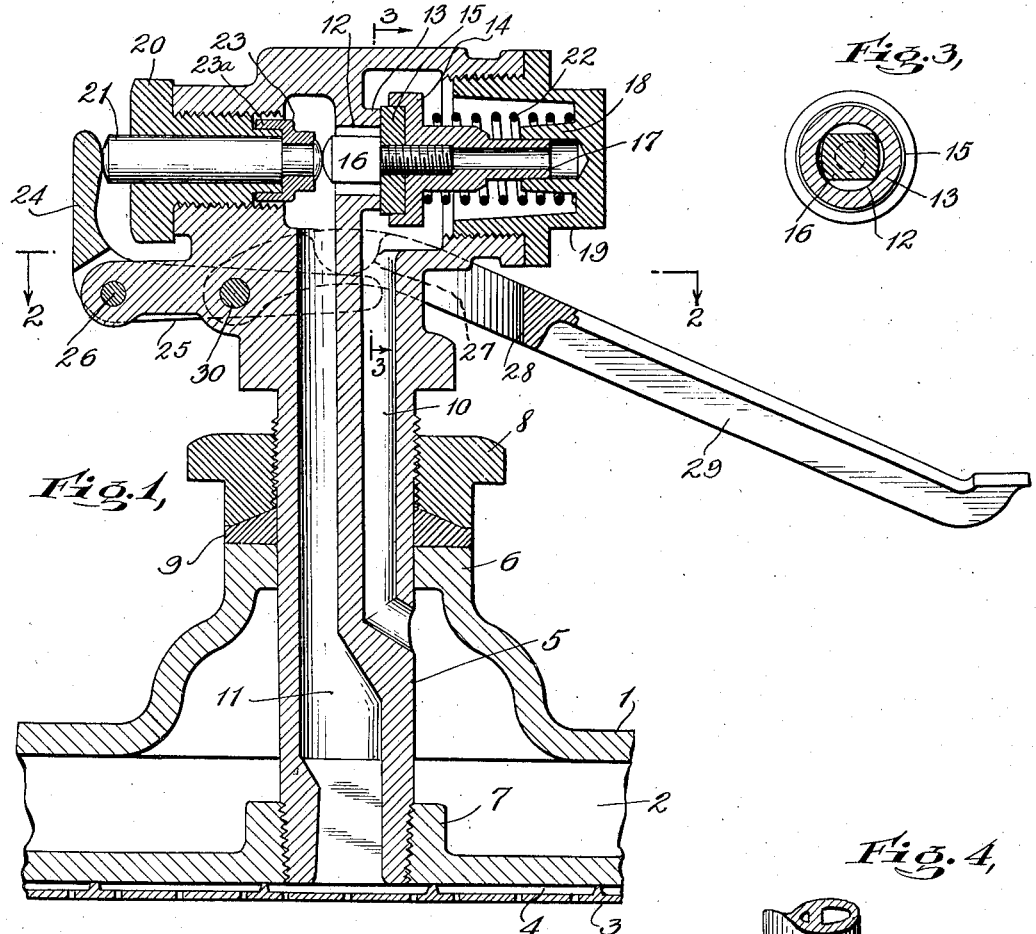
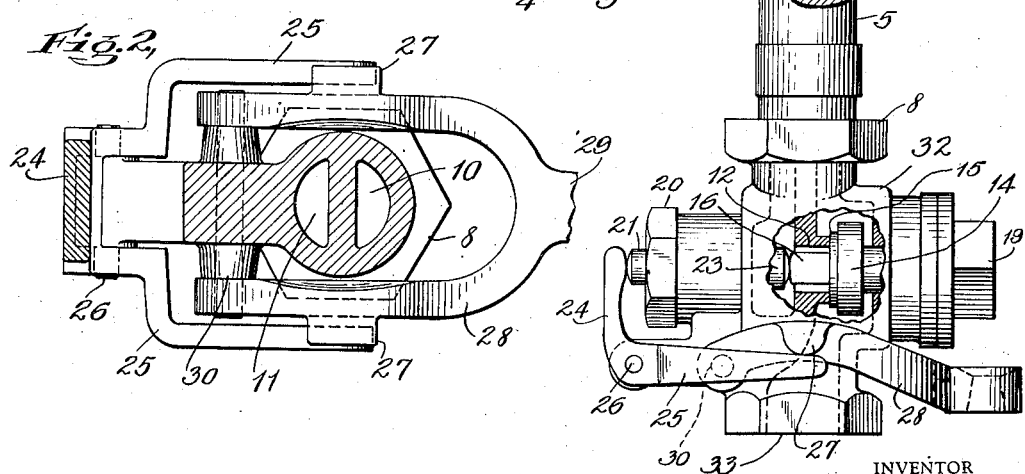
INVENTOR
HYMAN E. COHEN
HERBERT G BEEDE
BY
ATTORNEY Patented May 29, 1928.

1,671,179

UNITED STATES PATENT OFFICE.

HERBERT G. BEEDE, OF PAWTUCKET, RHODE ISLAND, AND HYMAN E. COHEN, OF BROOKLYN, NEW YORK, ASSIGNORS TO PANTEX PRESSING MACHINE, INC., OF PAWTUCKET, RHODE ISLAND, A CORPORATION OF DELAWARE.

VALVE FOR STEAM-PRESSING MACHINES.

Application filed May 17, 1927, Serial No. 192,044. Renewed April 7, 1928.

This invention is an improvement in valves; and more particularly in valves for controlling the steam supply of pressing machines.

In the usual construction of pressing machine, the steam supply is controlled by a valve having an internal port normally closed by a valve spring pressed to its seat, together with operating means for the valve outside the casing.

It is desirable that valves of this character be easily operated, and to conserve steam pressure, it is essential that the casing be tightly sealed against escape of pressure. The only opening in the casing is that through which the operating means for the valve extends, and packings of the usual stuffing box character not only become easily worn through movement of the operating parts, but tend to bind, thus making the valve difficult to open.

To facilitate opening, the operating mechanism outside of the casing is desirably of a character such as to compound the force exercised thereon at the valve, so that relatively small stress applied to the operating mechanism will readily open the valve.

One of the primary objects of the present invention is the provision in a machine of the character in question, of a valve construction wherein an efficient seal is provided for the valve operating mechanism, which extends through the casing wall, and the said wall, to prevent the escape of pressure, and wherein the seal is of a character to resist wear, thereby to maintain its efficiency in use.

Another object is the provision of an external operating mechanism for the valve, so connected thereto, that relatively small stress exerted in the said mechanism will open the valve, and wherein the valve is normally urged to closed position.

Another object is the provision of a valve including a casing, with a valve therein, and operating means passing through the wall of the casing, wherein the parts are so arranged that either the valve or the operating means may be removed as an entirety.

Another object is the provision of a simple, efficient and inexpensive construction, wherein the only packing required is in connection with the seating surface of the valve.

Another object is the provision in such a valve of means whereby it may be arranged to transmit steam pressure from one chamber of the machine to another, or to receive pressure from an external source and transmit to both chambers.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof:

Fig. 1 is a longitudinal section of the improved valve showing it connected with the head of a pressing machine.

Figs. 2 and 3 are sections on the lines 2—2 and 3—3 respectively of Fig. 1.

Fig. 4 is a front elevation with parts broken away of an embodiment of the valve designed for use with the buck of the machine.

The embodiment of the invention shown in Figures 1, 2 and 3 is designed for use with the head of a pressing machine of usual construction, the head indicated at 1 having the usual steam chamber 2, and the perforate plate 3 on its lower face, forming with the head surface a chamber 4 for distributing the steam to the perforations of the plate.

The improved valve, the casing of which is indicated at 5, passes through a nipple 6 in the outer wall of the chamber 2, to a threaded connection with a nipple 7 on the inner wall of said chamber. A packing nut 8 is threaded onto the casing at the end of the nipple 6, and a packing 9 is compressed between the nut and the end of the nipple.

The casing has two longitudinally extending passages, one of which 10 communicates with the chamber 2 and the other 11 with the chamber 4. Referring to Fig. 2, it will be noticed that these passages are segmental in cross section, thus providing for a maximum of capacity with a minimum size of casing. The passage 11 opens axially of the casing, while the passage 10 opens laterally, as clearly shown in Fig. 1.

A port 12 is provided in the outer end of the valve between the passages 10 and 11, and this port is encircled by a rib 13 on the inlet side. A valve cooperates with the rib for closing the port, the valve including a body 14, and a packing 15 held in a recess in the face of the valve by means of a headed screw 16 engaged with the valve body and passing through the packing.

The head of the screw as shown in Fig. 1 is polygonal in cross section, and moves in the port 12, thus to guide the valve, while at the same time offering no impediment to the passage of steam through the port. The body of the valve has a cylindrical extension 17, which engages a guide nipple 18 in a cap nut 19, which is threaded into an opening in the casing 5. It will be noticed referring to Fig. 1, that the casing 5 is substantially T-shaped, and that the cap nut 19 is at one end of the cross arm of the T.

The other end of the arm is closed by a nut 20 having a central opening, through which passes an operating pin 21. The inner end of the pin bears against the head of the screw 16, the arrangement being such that when the pin 21 is moved in one direction the valve will be opened. The valve is normally held closed by a spring 22 arranged between the body and the end of the cap nut 19.

A head 23 is connected with the inner end of the pin. The said inner end is reduced as shown to pass through a central opening in the head, and is riveted to hold the head in place. The upset end of the rivet bears against the screw head 16. The inner end of the nut 20 is annularly reduced as shown, and the head 23 has a flange or skirt 23ª engaging about the reduced portion when the valve is closed. As shown, the length of the reduced portion of the nut is slightly greater than the depth of the flange or skirt, so that there is a slight clearance between the end of the flange and the annular shoulder formed by the reduction of the nut end.

This arrangement provides a very efficient seal against the escape of pressure about the pin 21. In the first place the head and skirt baffle the direct flow of steam to the pin 21, and to reach the opening in which the pin moves, the steam must follow a sinuous or circuitous passage. Furthermore, the steam being baffled in the direct passage, condenses from air cooling of the valve body, filling the clearance space, and the surface tension of the condensate prevents the escape of either the steam or the condensate. The head also limits the outward movement of the pin.

The pin 21 is operated in a direction to open the valve by means of a yoke shaped lever comprising a body 24 and arms 25. The lever is pivoted at 26 to an extension of the casing 5, and the body bears against the outer end of the pin 21. The arms 25 extend on opposite sides of the casing 5, into position beneath lugs 27 on the arms 28 of a forked lever 29, which is pivoted at 30 to the casing. It will be evident that by downward pressure on the free end of the lever 28 the elbow lever will be rocked, and the body thereof will press the pin 21 inward, opening the valve 14 against the resistance of the spring 22. When the pressure upon the lever 28 is released, the spring will close the valve, and will return the other parts to their normal position.

The arrangement of the parts is such that relatively slight stress on the end of the lever 29 is required to open the valve. That is, the mechanism provides compound leverage to facilitate operation. The hand lever 29 operates through a straight line contact with the elbow lever, reducing friction losses and providing a very easy working valve. The threaded portion of the casing which engages the nipple 7 has a bore polygonal in cross section, usually square. That is, the portion of the passage 11 at the threaded end of the casing is polygonal, for engagement by a tool, to release the casing, in case it should become broken. It sometimes happens that the casing breaks near the nipple 7, or near the nut 8. In the first instance, the tool may be engaged with the polygonal portion of the passage. In the last, a forked tool may be engaged with the passages 10 and 11, thus to facilitate turning of the casing.

The embodiment of the invention shown in Fig. 4 is more particularly adapted for use with the buck of the machine, although it is obvious that either construction is suitable for use with both buck and head. In this embodiment of the invention, the improved valve indicated generally at 32 differs from the valve 5 of Fig. 1 in one respect only. Instead of being of T-shape, the casing is cross shaped. That end of the casing remote from the head has a port 33 for connection with a source of steam supply. It is obvious that by closing this port with a plug the valve is the same and may be used in the same manner as the valve shown in Fig. 1.

With the port open and connected to a steam supply, steam would flow to both chambers 2 and 4. In the Fig. 1 construction steam flows through the passage 10, the port 12, and the passage 11 to the chamber 4.

The steam passage on the low pressure side of the valve is larger, as shown, than the high pressure passage, to allow for the gradual expansion of the steam, and to relieve the valve stem from unnecessary pressure. The high pressure steam passage is angular at the neck end of the valve to facilitate easy flow of steam into the head valve, and easy flow of steam as well as directional from the buck valve. The buck valve is constructed with the high pressure steam passage extending from the screw and through the body and out through the directional passage, so that practically the entire length of the valve is heated by the flow of steam through the valve, thus preventing excessive condensation when steam is required to supply hot steam from the buck.

The body of the valve serves as an up-stroke limit for the hand lever, the upper inside edges of the forked arms being chamfered to enable an upward freedom limited by the circular part of the valve body. The downward movement of the lever is limited by the polygonal collar between the valve body and the neck in the case of the head valve, and at the extreme end in the case of the buck valve.

What is claimed as new is:

1. A valve comprising a casing having longitudinally extending passages opening at one end of the casing, and a port connecting the passages near the other end, a valve and an operating pin therefor, the valve having a portion engaged by the pin, a spring normally seating the valve, and operating mechanism outside the casing engaging the pin to open the valve, the casing and the pin having interengaging means for sealing the space between the pin and the casing when the valve is opened and closed.

2. A valve comprising a casing having longitudinally extending passages opening at one end of the casing, and a port connecting the passages near the other end, a valve and an operating pin supported in alinement with the port, the valve having a portion engaged by the pin, a spring normally seating the valve, and operating mechanism outside the casing engaging the pin to open the valve, a support in which the pin is slidable detachably connected with the casing, the support and the pin having interengaging means for sealing the space between the pin and the support when the valve is opened and closed.

3. A valve comprising a casing having longitudinally extending passages opening at one end of the casing, and a port connecting the passages near the other end, a valve and an operating pin supported in alinement with the port, the valve having a portion engaged by the pin, a spring normally seating the valve, and operating mechanism outside the casing engaging the pin to open the valve, a support in which the pin is slidable detachably connected with the casing, the support and the pin having interengaging means for sealing the space between the pin and the support when the valve is opened and closed, said means comprising a flanged head on the inner end of the pin, the inner end of the support reduced to engage within the flange.

4. A valve comprising a casing having longitudinally extending passages opening at one end of the casing, and a port connecting the passages near the other end, a valve and an operating pin, a support for holding the pin in alinement with the port, the valve having a portion engaged by the pin, a spring normally seating the valve, operating mechanism outside the casing engaging the pin to open the valve, a threaded opening in the casing for the support, the inner end of the support annularly reduced, and a head secured to the inner end of the pin and having an annular flange seated about the reduced portion of the support when the valve is opened and closed.

5. A valve comprising a casing having longitudinally extending passages opening at one end of the casing, and a port connecting the passages near the other end, a valve and an operating pin, a support for holding the pin in alinement with the port, the valve having a portion engaged by the pin, a spring normally seating the valve, operating mechanism outside the casing engaging the pin to open the valve, a threaded opening in the casing for the support, the inner end of the support annularly reduced, and a head secured to the inner end of the pin and having an annular flange seated about the reduced portion of the support when the valve is opened and closed, clearance being provided between the free edge of the flange and the outer end of the reduced portion.

6. A valve comprising a casing having longitudinally extending passages opening at one end of the casing, and a port connecting the passages near the other end, a valve and an operating pin supported in alinement with the port, the valve having a portion engaged by the pin, a spring normally seating the valve, an elbow lever pivoted to the casing and having an arm engaging the outer end of the pin, and a hand lever pivoted to the casing and engaging the other arm of the elbow lever.

7. A valve comprising a casing having longitudinally extending passages opening at one end of the casing, and a port connecting the passages near the other end, a valve and an operating pin supported in alinement with the port, the valve having a portion engaged by the pin, a spring normally seating the valve, an elbow lever pivoted to the casing and having an arm engaging the outer end of the pin, and a hand lever pivoted to the casing and engaging the other arm of the elbow lever, the casing having means to limit the swinging movement of the hand lever.

8. A valve comprising a casing having longitudinally extending passages opening at one end of the casing, and a port connecting the passages near the other end, a valve and an operating pin supported in alinement with the port, the valve having a portion engaged by the pin, a spring normally seating the valve, an elbow lever pivoted to the casing, one arm thereof engaging the pin, a hand lever pivoted to the casing and extending in substantial alinement with the other arm of the elbow lever, and having means to engage said arm to swing the same to move the pin.

9. A valve for pressing machines, including a substantially T-shaped casing having passages extending longitudinally thereof, one passage opening at the end of the casing remote from the cross of the T and the other opening laterally, the casing having openings at the respective ends of the cross arm, and nuts threaded into the openings, said casing having a port in alinement with the nuts, a valve slidably connected with one nut, a spring arranged between the nut and the valve and normally pressing it toward the port, a pin slidable in the other nut and having means engaging the nut to limit the outward movement of the pin, the first named nut of greater diameter than the valve to enable the removal thereof when the nut is detached, and means for moving the pin toward the valve, said casing having a port at the end adjacent the cross arm for the purpose specified.

Signed at New York city, in the county of New York and State of New York, this 2nd day of May A. D. 1927.

HERBERT G. BEEDE.
HYMAN E. COHEN.